United States Patent
Gauzner et al.

(10) Patent No.: US 8,792,201 B2
(45) Date of Patent: Jul. 29, 2014

(54) METHOD OF DISC ALIGNMENT USING PRINTED ALIGNMENT MARKS

(75) Inventors: Gennady Gauzner, San Jose, CA (US);
David S. Kuo, Palo Alto, CA (US);
Justin Jia-Jen Hwu, Fremont, CA (US);
Li-Ping Wang, Fremont, CA (US);
Zhaoning Yu, Mountain View, CA (US);
Kim Yang Lee, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 1246 days.

(21) Appl. No.: 12/629,791

(22) Filed: Dec. 2, 2009
(Under 37 CFR 1.47)

(65) Prior Publication Data
US 2011/0128647 A1    Jun. 2, 2011

(51) Int. Cl.
*G11B 21/02*    (2006.01)
*G11B 5/82*    (2006.01)
*B82Y 10/00*    (2011.01)
*G11B 5/855*    (2006.01)
*G11B 5/74*    (2006.01)
*G11B 25/04*    (2006.01)

(52) U.S. Cl.
CPC .............. *G11B 25/043* (2013.01); *B82Y 10/00* (2013.01); *G11B 5/855* (2013.01); *G11B 5/743* (2013.01); *G11B 5/746* (2013.01); *G11B 5/82* (2013.01)
USPC ............................ 360/75; 360/135; 29/603.01

(58) Field of Classification Search
CPC .... G11B 25/043; G11B 5/855; G11B 25/746; G11B 5/82; G11B 5/743; B82Y 10/00
USPC ............. 360/75, 77.04, 77.03, 69, 99.12, 31, 360/135, 133, 48, 98.08, 99; 720/623; 427/127, 128, 129, 130, 131, 132, 75, 427/77.04; 216/97; 29/603.1
See application file for complete search history.

(56) References Cited

U.S. PATENT DOCUMENTS

| | | | | |
|---|---|---|---|---|
| 4,675,768 | A * | 6/1987 | Okuzawa | 360/133 |
| 4,933,927 | A * | 6/1990 | Ross | 720/623 |
| 6,201,661 | B1 * | 3/2001 | Korkowski | 360/98.08 |
| 6,914,742 | B1 * | 7/2005 | Fioravanti et al. | 360/75 |
| 2002/0101680 | A1 * | 8/2002 | Ottesen et al. | 360/77.03 |
| 2002/0145823 | A1 * | 10/2002 | Kilmer | 360/99.12 |
| 2003/0223144 | A1 * | 12/2003 | Smith et al. | 360/75 |

(Continued)

*Primary Examiner* — Kevin M. Bernatz
*Assistant Examiner* — Louis Falasco
(74) *Attorney, Agent, or Firm* — Braden Katterheinrich (57) ABSTRACT

Processes include aligning a disc with a template at a location so that the pattern from the template is transferred to the disc in a relative orientation. The relative orientation provides that when the disc with the transferred pattern is finally assembled into a hard disc drive, an inner diameter of the spindle hole of the disc may be abutted against an outer diameter of the disc drive spindle, and the data-containing patterns on the discs will be aligned concentrically with a center of the disc drive spindle. While the data-containing patterns are aligned concentrically with the disc drive spindle, the substrate itself is allowed to be non-concentric. Still other aspects include a disc having eccentric formations including PIM and one or more of bit patterns and servo information formed on a disc surface, the eccentricity of the formations is determined based on an expected difference between the radius of the spindle hole of the disc and the radius of the spindle on which the disc will be placed during assembly, with the PIM used to determine the angular alignment of the disc with the spindle.

20 Claims, 4 Drawing Sheets

(56) References Cited

U.S. PATENT DOCUMENTS

2004/0240099 A1* 12/2004 Brannon et al. ............... 360/75
2006/0012904 A1* 1/2006 Naruse et al. ................. 360/75
2008/0043362 A1* 2/2008 McLeran ....................... 360/75
2008/0204934 A1* 8/2008 Tsuchiya et al. .............. 360/135
2009/0073605 A1* 3/2009 Schreck ........................ 360/97.01
2009/0141395 A1* 6/2009 Nagata ......................... 360/99.08

* cited by examiner

METHOD OF DISC ALIGNMENT USING PRINTED ALIGNMENT MARKS

BACKGROUND

1. Field

Embodiments of the present invention relate in general to disc shaped recording media, and more particularly to alignment a disc storage media within a disc drive unit.

2. Description of the Related Art

Hard disc drives provide prerecorded tracking servo information on data recording surfaces of their magnetic hard discs. This servo information is typically spaced evenly along tracks. Data is recorded between the servo information. In some cases, servo information is radially aligned, and looks like spokes of a wheel.

During operation, the disc drive magnetic read/write head flies over the spinning discs and reads information from the tracks as the information passes beneath the head. This information includes both data and servo information. The servo information tells the disc drive servo system where the head is in relation to the track in order that the disc drive servo system may adjust the head's radial position to keep the head on track center.

The servo information may be written onto a disc's surface using a variety of techniques. A newer approach mounts a large number of discs onto a spinstand and writes the servo information onto all of them at the same time. This approach, also known as "multiple disc write" ("MDW"), is attractive because a number of discs maybe written at the same time. However, this approach also introduces a number of problems because the discs themselves are not assembled onto the disc drive spindle at the time servo tracks are written.

One of the problems is that the disc must be mounted onto the drive spindle in the same "orientation" it was written. For example, if the servo tracks were written by a rotary actuator, the servo burst will be arrayed in an arc that follows the arc of the servo-track writer. To read such servo information properly, the disc drive's actuator should be aligned to traverse the same arc as the servo-writer. For this to occur, the discs are mounted in the same orientation for the disc drive's actuator as they were for the servo-writer's actuator. In most cases, this is accomplished by assuring that a disc's "top" surface when it is mounted in the servo-writer also be the "top" surface when that same disc is mounted in the disc drive.

A second problem occurs when two (or more) such prerecorded MDW discs are mounted in a single disc drive. Not only should the arcs of both discs be aligned, but also the tracks themselves should be substantially aligned vertically, that is, the tracks of one disc should be substantially congruent with tracks of the other discs such that they form "aligned" cylinders. In this manner, the disc drive can switch between a head reading a specific track number on the top surface of the topmost disc, to a head reading the same track number on of the top surface of the next disc in the stack without needing to perform a seek. If the respective tracks were significantly misaligned in some fashion, switching between them without performing a seek or some other alignment technique would not be possible. After a head switch, the drive may need to find out its location. This may even require it to seek a track "0" in order to recover a proper track number.

A third problem caused by writing servo data while the disc is mounted on a different spindle is track eccentricity. A hard disc's inner diameter has a tolerance specification much looser than the track eccentricity specification of most disc drive servo systems. If the disc is mounted on the disc drive's spindle in a manner that is significantly off center from the way it was written on the servo writer, it could exceed the drive's servo system eccentricity tolerance. While most disc drive servo systems have eccentricity feed forward mechanisms to help increase their eccentricity tolerances, these feed forward systems typically have stroke limits far below the loosest tolerances for hard disc inner diameters.

Another problem is the angular alignment of the servo spokes from one disc to another. If the angular misalignment is too large, the drive cannot reliably switch heads from one disc surface to another located on a second disc.

A current practice for achieving such alignment is to bias all the discs in the MDW servo-writer against the servo-writer's spindle so that each of the discs' inner diameters is vertically aligned at a point of contact with the servo-writer's spindle. Thereafter, when these discs are assembled onto a disc drive's spindle, alignment of their inner surface contact points that abut against the disc drive spindle causes them to have the same vertical alignment they had in the MDW servo-writer. Depending on the precision of alignment of the discs in both the MDW servo-writer and in the disc drive, and upon the precision that the respective servo information is written by the MDW servo-writer, the alignment of the inner surface contact points automatically aligns the tracks of respective discs congruently into the same cylinders they had on the servo-track writer.

A conventional way to align the discs onto both the servo-track writer and disc drive spindles so that the same portion of the disc inner surface contacts each is to mark the discs with a laser prior to their being loaded onto the MDW servo-writer. However, the laser marking tools are expensive and bulky, they require substantial clean room space and different tools are required to mark glass and nickel phosphorus/aluminum substrates. Finally, the use of a laser marking tool can adversely impact drive reliability in a number of ways.

One approach to solving these problems with using laser markings was to record the alignment marks magnetically when the servo track data is written. Commonly assigned U.S. Pat. Nos. 7,221,528 and 6,940,678 describe the use of magnetic alignment marks, also referred to as magnetic index marks (MIMs), to indicate the location on a magnetic recording surface of a magnetic hard disc where the disc abuts against the spindle of a multiple-disc servo writer. MIMs are especially well suited for use with magnetic media in which the disc head can be used to write the alignment marks.

Patterned magnetic media refers to hard disc recording media produced using techniques to achieve higher recording density by printing individual grains onto the magnetic media. Using these techniques, a data bit can be stored on a single grain, resulting in greater disc storage density. More specifically, Discrete Track Recording (DTR) or Bit Patterned Media (BPM) processes can be used to imprint islands (tracks for DTR) onto a substrate of a data storage disc. To produce the islands, a template is formed. Once the template is created, it can be used in a process to produce patterned media.

It is appreciated that analogous alignment problems persist for patterned magnetic media. Producing alignment marks with lasers is undesirable for the reasons set forth above. Moreover, producing MIMs is impractical for patterned magnetic media in which data is encoded magnetically using nanolithography techniques. Thus, there has been a need to produce alignment marks for printed magnetic media.

SUMMARY

Accordingly, what is needed is a mechanism and method for aligning a disc media within a hard drive unit. More specifically, what is needed is a mechanism and method for aligning a template pattern of a disc media such that it is centered about the center of a spindle of the hard drive unit. Embodiments of the present invention provide these advantages.

Embodiments of the present invention provide a method for proper alignment of a disc media within a hard drive unit such that the concentric tracks of a template pattern are centered about a spindle of the hard drive unit. The method includes providing alignment marks on a disc media, and aligning the template relative to a disc substrate where the substrate includes a spindle hole. The template defines a template pattern comprising an alignment mark to be positioned with respect to a center of the spindle hole. The positioning of the template pattern with respect to the spindle hole center is determined based on determining a radial direction between the center of the spindle hole and the alignment mark. The method further includes offsetting a center of the template pattern with respect to the spindle hole center along the radial direction by an amount determined by subtracting from the radius of the spindle hole a radius of a spindle expected to be disposed in the spindle hole during a drive assembly process.

The method also includes outlining, using the template pattern, a substrate pattern to be etched on a surface of the substrate and etching the substrate pattern onto the surface according to the outline so that pattern is transferred to the disc substrate according to the alignment process described above.

Embodiments of the present invention also include the disc media produced by the above process. The disc produced includes rings of bit patterns or tracks eccentric around the disc spindle hole, whereupon when the disc is assembled on a spindle it can be abutted against the spindle at an angular orientation determined by the PIM, causing the rings to be concentric around the spindle, even though they are eccentric around the spindle hole of the disc.

Further embodiments of the present invention include the method of using the pattern etched onto the disc media for alignment of the disc media within a hard drive unit. Embodiments further include a hard drive unit constructed using the disc media embodiment.

DETAILED DESCRIPTION

The following description is presented to enable any person skilled in the art to use a method to produce a printed index mark (PIM), also referred to herein as "alignment pattern" on a patterned magnetic media hard disc and to use the PIM to align discs during hard disc assembly. The PIM corresponds to an inner disc surface location that abuts a hard disc spindle during disc drive assembly. Aligning multiple discs on a spindle, based on the PIM, helps to reduce disc drive head seek time because tracks are cylindrically congruent. Various modifications to the disclosures will be readily apparent to those skilled in the art, and the generic principles defined herein may be applied to other embodiments and applications without departing from the spirit and scope of the invention. In the following description, numerous details are set forth for the purpose of explanation. However, one of ordinary skill in the art will realize that the invention might be practiced without the use of these specific details. In order to more efficiently illustrate and describe exemplary aspects, identical reference numerals are used in the specification and drawings to identify parts that are essentially the same in different stages, versions or instantiations of such parts shown in the drawings. Thus, the present invention is not intended to be limited to the examples shown, but is to be accorded the widest scope consistent with the principles and features disclosed herein.

Figure 1:
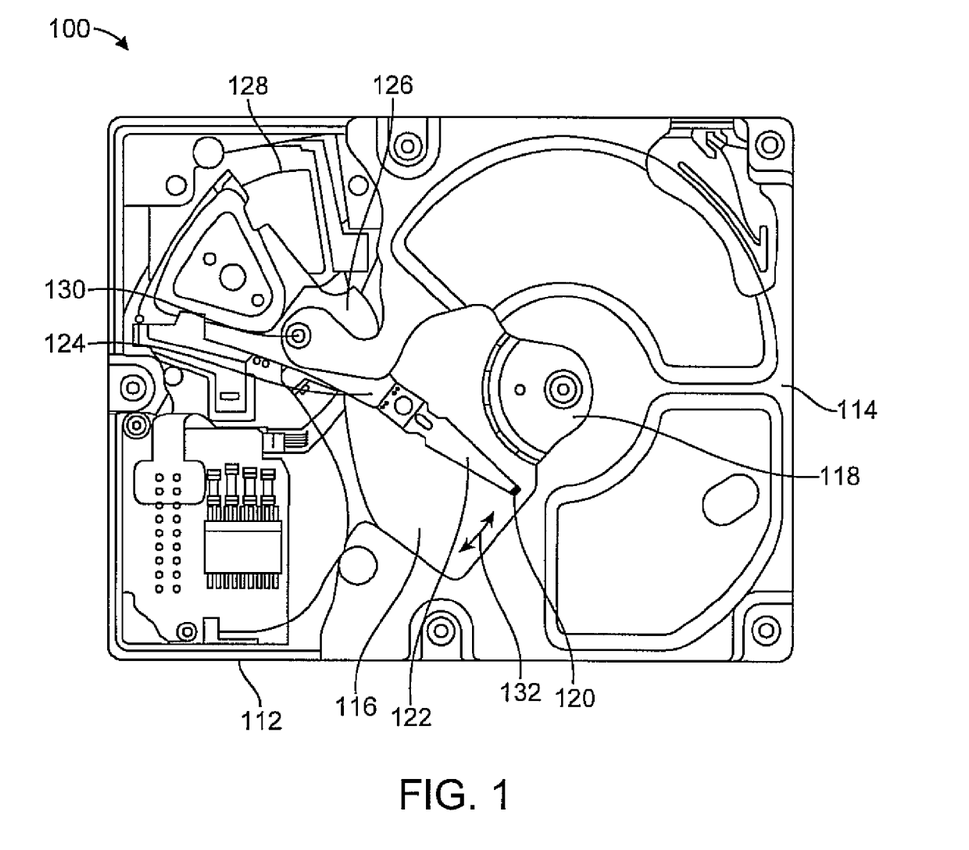
FIG. 1 depicts a plan view of one embodiment of a disc drive unit having a disc media onto which is etched a template pattern in accordance with embodiments of the present invention.

FIG. 1 depicts one embodiment of a disc drive 100 or disc drive "unit" that can include media in accordance with embodiments of the present invention. Referring to FIG. 1, the disc drive 100 includes a housing base 112 and a top cover plate 114. The housing base 112 is combined with cover plate 114 to form a sealed environment to protect the internal components from contamination by elements outside the sealed environment. The base and cover plate arrangement shown in FIG. 1 is well known in the industry; however, other arrangements of the housing components have frequently been used, and drive 100 implies no limitation in configuration of the disc drive housing. Disc drive 100 further includes a disc pack 116 that is mounted on a hub for rotation on a spindle motor (not shown) by a disc clamp 118.

Disc pack 116 includes one or more of individual discs that are mounted for co-rotation about a central axis. The surfaces of the discs include, etched thereon, patterns and a PIM in accordance with embodiments of the present invention. These patterns and PIM help to align the disc within respect to the center of the spindle. The spindle rotates the discs within the disc pack 116. Each disc surface has an associated read/write head 120 that is mounted to the disc drive 100 for communicating with the disc surface.

In the example shown in FIG. 1, read/write heads 120 are supported by flexures 122 that are in turn attached to head mounting arms 124 of an actuator 126. The actuator shown in FIG. 1 is of the type known as a rotary moving coil actuator and includes a voice coil motor, shown generally at 128. Voice coil motor 128 rotates actuator 126 with its attached read/write heads 120 about a pivot shaft 130 to position read/write heads 120 over a desired data track along a path 132.

In accordance with one embodiment of the present invention, the disc media is imprinted with a PIM and a pattern using a template created on a wafer. The template may be manufactured by placing an E-Beam resist coating onto a template substrate and using an E-Beam writer to place the alignment marks, servo information, and data bit pattern ("template pattern") onto the resist layer of the disc. Next, the resist that has been exposed to the E-Beam is removed in a process called reactive ion etching (RIE). Using such a process, the PIM and pattern are disposed on the surface of the disc along with servo information. The template could also be made in other ways such as mix-and-match lithography.

Figure 2A:
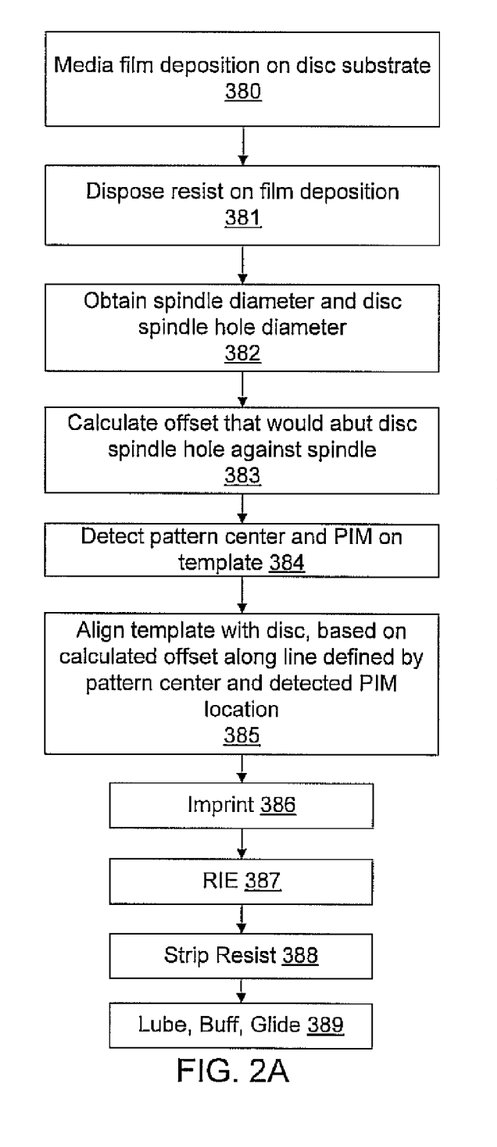
FIG. 2A is an illustrative flow diagram of a process to produce PIM and template pattern on a disc media according to one embodiment of the present invention.

FIG. 2A depicts aspects of an example process to produce a disc having a PIM and template pattern. In step 380, a magnetic film layer is deposed to be supported from a disc substrate. A resist layer is disposed (step 381) on the magnetic film. The disc substrate includes a hole with an outer diameter. In step 382, the outer diameter of that hole is obtained, such as by example, from optical recognition of a code imprinted on an area of the disc, or by inspection. Also, in step 382, a diameter of a spindle of a drive in which the disc will mounted, after pattern transfer, is obtained.

A template is obtained (part of step 384) bearing a pattern including a PIM and may include other formations for defining one or more of tracks (in Discrete Track Recording) or domains (for Bit Patterned Media), which may be referred to herein as "tracks or rings," for data storage and servo patterns that can be used for head alignment. The PIM and these data storage and/or servo patterns will be transferred from the template to the disc surface. Also in step 384, a center of the servo/data pattern around a central axis is determined, and the PIM also is identified.

In step 385, the template and the disc are aligned so that their respective centers are misaligned along a line defined by the PIM and the center of the template pattern. An amount of misalignment is determined based on subtracting the radius of the drive spindle from the radius of the disc hole (or another appropriate computation related to the sizes of the hole and the spindle, which fits in the hole). The template pattern is then imprinted (step 386) on the resist, and reactive ion etching (step 387) and associated processing is performed to transfer the pattern to the substrate. Excess resist can then be stripped (step 388) and further surface preparation steps including lubricating, buffing and gliding to increase surface smoothness can be performed (step 389). In some cases, a step of filling voids in the magnetic film (formed to define storage domains and servo information) can be done before the buffing, in order to increase planarization.

In this fashion, a disc to be imprinted has a spindle hole with a larger diameter than a spindle of a drive in which the disc will be mounted. Coaxially aligning the hole around the smaller spindle in a precise manner can prove difficult, and can require more precision equipment. Rather, in accordance with embodiments of the present invention, when the disc is imprinted, a printed alignment mark is provided at a determined angular orientation on surface(s) of the disc, and so the PIM can be advantageously used to angularly align the disc on the spindle during assembly. Further, the template and the disc are misaligned along the line defined by a center of the template pattern and the PIM, so after pattern transfer to the disc, the pattern is not concentric on the disc. However, in accordance with embodiment of the present invention, when the disc is abutted against the side of the spindle and angularly aligned according to the PIM, the pattern on the disc will be concentric around the spindle, even though the disc itself is not concentric around the spindle.

Because the disc is not concentric around the spindle, some counterbalancing may be performed if there is found to be mechanical vibration or wobbling. Thus, embodiments according to this example include intentional non-concentric alignment of a pattern on a disc, and an opposite non-concentric alignment of the disc on a drive spindle, so that the physical disc is non-concentric on and abutted to the spindle, while the pattern is concentric around the spindle. Machinery to assemble drives according to this methodology can be less precise than machinery for coaxially aligning discs around spindles, especially when attempting to align a stack of discs on a spindle.

Figure 2B:
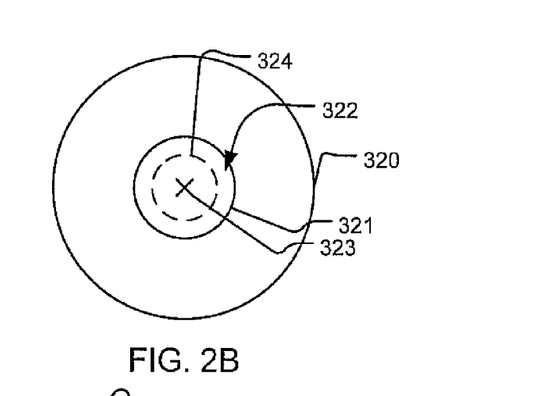
FIGS. 2B, 2C and 2D pictorially illustrate portions of a disc media in accordance with aspects of the process of FIG. 2A.
Figure 2C:
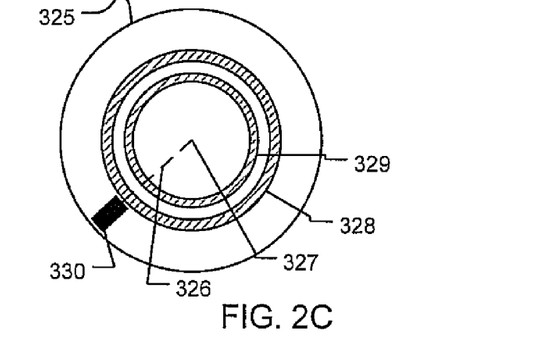
Figure 2D:
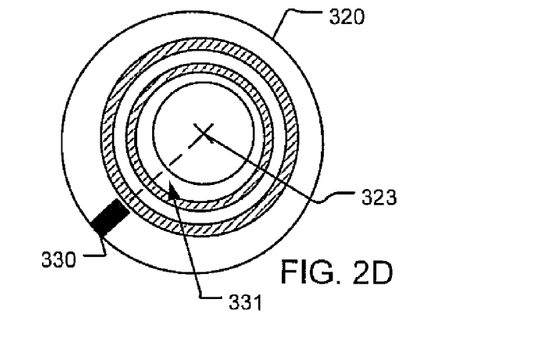

FIGS. 2B-2D depict surface of disc media in accordance with aspects of the steps of the method illustrated in FIG. 2A. FIG. 2B illustrates a disc 320 having a central hole 322 defined by a wall 321. A center 323 of disc 320 is identified. A dashed circle 324 represents an expected size of a spindle for a drive unit in which the disc ultimately will be assembled. FIG. 2C illustrates a template pattern 325 on which is formed a first track 328 and a second track 329 concentric around a template center 327. A PIM 330 is also on template 325, and a line defined by PIM 330 and center 327 is identified as a dashed line 326.

FIG. 2D illustrates disc 320 after tracks 328 and 329 (and PIM 330) have been transferred from template 325 to disc 320. The alignment of the transferred tracks is shown offset from disc center 323. The offset amount is identified by number 331 and represents a difference between the radius expected of spindle 324 and the radius of hole 322, as defined by wall 321. Thus, the transfer of the pattern from template to disc is performed so that the pattern is concentrically offset from a center of the disc. Then, as will be explained with respect to FIG. 4, when the disc is disposed abutting the spindle, the tracks will be concentric around the drive spindle.

Processes according to embodiments of the present invention include aligning a disc with a template at a location so that the pattern from the template is transferred to the disc in a relative orientation. The relative orientation of the disc and the template pattern provides that when the disc with the transferred pattern is finally assembled into a hard disc drive, an inner diameter of the spindle hole of the disc may be abutted against an outer diameter of the disc drive spindle, while the data-containing patterns (e.g., tracks, rings of bit patterns, servo information) on the discs will be aligned concentrically with a center of the disc drive spindle. While the data-containing patterns are aligned concentrically with the disc drive spindle, the substrate itself is allowed to be non-concentric. A further step of balancing the rotational dynamics of the assembled drive may be provided to account for this eccentricity. Still other aspects include a disc having eccentric formations including PIM and one or more of bit patterns and servo information formed on a disc surface, the eccentricity of the formations is determined based on an expected difference between the radius of the spindle hole of the disc and the radius of the spindle on which the disc will be placed during assembly, with the PIM used to determine the angular alignment of the disc with the spindle.

Figure 3:
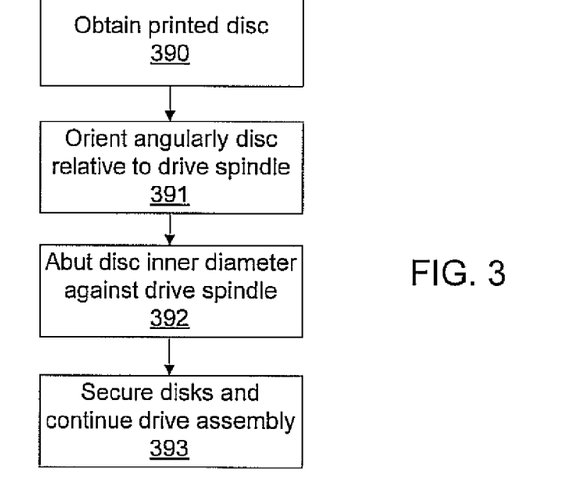
FIG. 3 is an illustrative flow diagram of a process to align a disc media within a disc drive unit using a disc media with PIM and template patterns produced according to the process of FIG. 2A.

FIG. 3 depicts a process in accordance with embodiments of the present invention for using a disc formed according to the above examples for alignment into the disc drive unit. In step 390, a disc formed according to the above examples is obtained. In step 391, it is oriented angularly relative to a spindle of a drive (and disposed on the spindle). The angular orientation is determined by detecting the PIM and orienting based on the PIM. The disc is pushed to abut an inner diameter of the spindle hole of the disc against the spindle at the angular orientation determined based on the PIM (e.g., aligning the abutment location to a line between the disc center and the PIM location. In step 392, the discs are secured in their abutted orientation and other steps in drive assembly can be performed. In one aspect, such steps can include a step of balancing the disc pack as assembled (in that it is at least slighting eccentric on the spindle and may wobble to some extent without such balancing). Because the tracks were formed eccentrically on the disc in an amount determined by subtracting the spindle radius from the radius of the disc spindle hole, the abutting step causes the tracks of servo and/or data storage domains to be concentric around the spindle.

Figure 4:
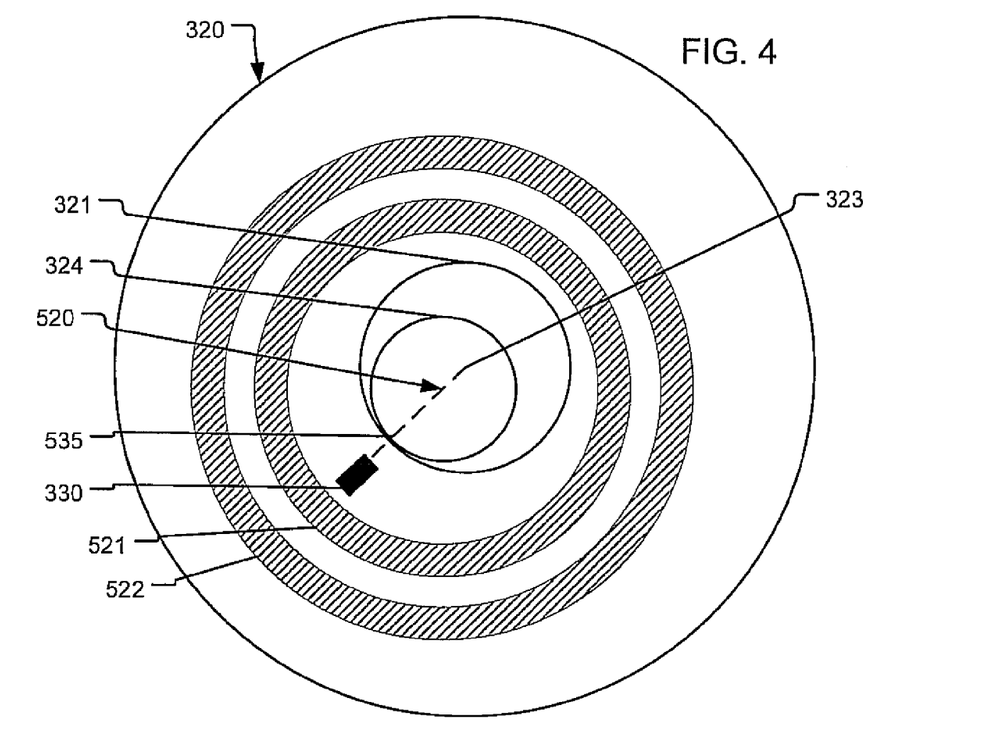
FIG. 4 illustrates an exaggerated top view of a magnetic hard disc shown abutting against a spindle at a disc's inner surface. The figure also shows a PIM located on a radial line extending from the point of contact between the disc inner surface and the spindle.

FIG. 4 depicts aspects related to assembling discs formed according to the above description into a disc drive. FIG. 5 depicts (not to scale) disc 320 biased such that the hole defined by its inner facing radial surface abuts spindle 324 at point 535. Point 535 is determined based on a line between PIM 330 and pattern center 323.

In FIG. 4, the ultimate eccentricity between the center of the disc (323) and the tracks 522 and 521 is exaggerated to show more clearly the effective result. As shown, after abutting the disc against the spindle, the tracks 522 and 521 are concentric around a center 520 of the spindle 324, and not of the disc center 323. Thus, the physical extent of disc 320 is eccentric around the center 520 of spindle 324. A second PIM may also be provided on the opposite side of disc 520.

In this manner, the detection of the PIM provided on disc 520 is used in determining the abutment location 535, such determination can include using robotic tooling, not shown, in performing the biasing of the disc such that the disc 520 inner surface 321 abuts the spindle 324 at location 535. In view of the previous disclosure, although the physical disc would be eccentric with respect to a center of the spindle on which it is disposed, the data tracks and other information transferred by the template would be concentric with the spindle, by virtue of the built in biasing described above. The eccentricity of the rotation of the disc can be corrected, if necessary, by providing counter balancing weights.

The built-in biasing methodology disclosed herein thus avoids having to attempt to center the larger disc spindle hole around the smaller diameter spindle, which may require more care and more complex and expensive metrology equipment and/or assembly equipment.

For ease of explanation, the PIM marks depicted were single marks. However, PIM can be provided that also allow differentiation between sides of the disc. The example PIM in FIGS. 5A and 5B, and 6A and 6B below illustrate embodiments of such PIM. Other relative shapes and sizes of two or more discrete markings can be designed according to these examples.

Figure 5A:
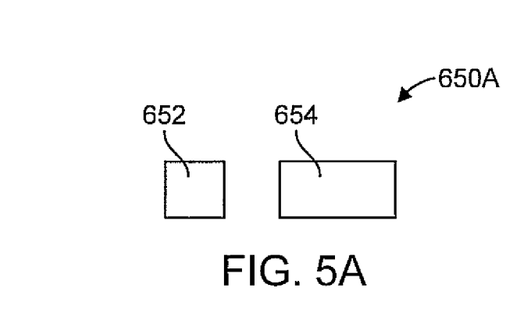
FIG. 5A illustrates an example of a PIM formation.
Figure 5B:
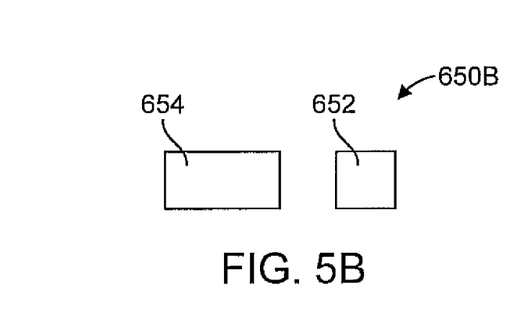
FIG. 5B illustrates an example of a PIM formation that can be used on an obverse side of a disc with PIM according to the example of FIG. 5A.

FIGS. 5A and 5B are illustrative drawings of alternate PIM in accordance with some examples. The PIM include two rectangles, one larger than the other. The larger rectangle may have sides that are equal to or larger than the smaller rectangle. Pattern 650A is placed on the top surface of disc 510. Pattern 650A includes small rectangle 652 followed by large rectangle 654. Pattern 650B is placed on the bottom surface of disc 510. Pattern 650B includes large rectangle 654 followed by small rectangle 652. These PIM allow either a human or robot to optically distinguish between the top and bottom of the disc.

Figure 6A:
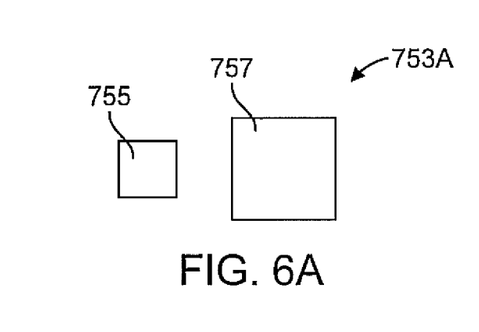
FIG. 6A illustrates a second example of how the PIM may appear on one side of a magnetic media disc.
Figure 6B:
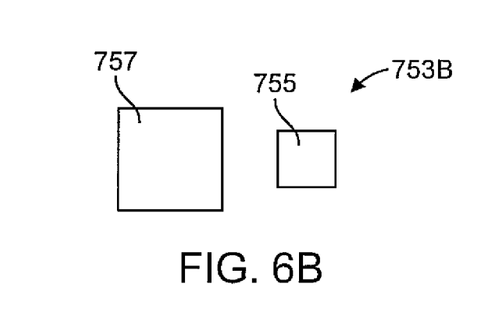
FIG. 6B illustrates a second example of how the PIM may appear on the obverse side of the disc of FIG. 6A.

Similarly, FIGS. 6A and 6B are illustrative drawings of alternate PIM in accordance with some examples. The PIM include two rectangles, one larger than the other. The larger rectangle may have sides that are equal to or larger than the smaller rectangle. Pattern 753A is placed on the top surface of disc 510. Pattern 753A includes small rectangle 755 followed by large rectangle 757. Pattern 753B is placed on the bottom surface of disc 510. Pattern 753B includes large rectangle 757 followed by small rectangle 755. These PIM allow either a human or robot to optically distinguish between the top and bottom of the disc.

When a robot or human operaTor (not shown) mounts disc 510 either on a servo writer surface (not shown) or on disc drive spindle 530, he assures that the top surface 512 is mounted facing "up." (The up or down direction here is figurative only. The intent is that the discs have a consistent relationship with the rotary actuators that are used in either a servo-writer or the disc drive itself) Therefore, a typical step in identifying PIM 650A and 650B with various optical detectors is to determine whether it is a top surface mark or bottom surface mark. Thereafter, disc 510 is oriented properly when it is mounted on spindle 530 so that top surface 512 is facing up and the bottom surface is facing down.

PIM 650A and 650B or 753A and 753B may be written onto disc 510 either before it is mounted in the servo writer (not shown), or after disc 510 has been mounted on the servo writer. If the PIM is written before the disc is mounted on the servo writer spindle 530, a robot or operator typically orients the disc so that its top surface is up, and then biases the disc so that its inner surface abuts against the spindle at location 540.

In contrast, if the disc has not been imprinted with PIM 650A and 650B or 753A and 753B, an operator or robot merely biases the disc inner surface to an arbitrary location. Thereafter, the PIM 650A and 753A are written on the disc in a predefined location in relationship corresponding to the abutment location 540. As illustrated in FIG. 6, the predefined relationship is along a radial line that runs through inner surface location 540. The PIM may be written anywhere along the radial line so long as they do not thereafter interfere with the reading and writing of data either during servo write or during normal disc drive operation.

If a template used to form PIM 650A/650B and/or 753A/753B also includes servo information, as is preferred, then a separate servo information writing step is not needed. Thus, the PIM forming steps also can be considered to write servo information, and hence be a servo writer.

In any case, when disc 510 is to be mounted on a spindle, PIM 650A/650B and/or 753A/753B can be used to align disc 510 with respect to the spindle, as well as for orienting surfaces of the disc properly. The spindle can be a spindle of a servo writer as well as a spindle of a disc drive. Thus, a robot or operator can detect such a PIM using various optical detectors or visual inspection for mounting disc 510 on a spindle, such as disc drive spindle 530. In some cases, the spindle can then spin up the disc to an operating rotational velocity so that a specialized head with an angular position sensor may be used.

Those of ordinary skill may vary the methods for printing the PIM, varying their location on a disc surface, and their patterns, based on these disclosures, without deviating from the scope of the appended claims and/or their equivalents.

What is claimed is:

1. A method of etching a disc, the method comprising:
   aligning a template relative to a substrate of the disc, the substrate comprising a spindle hole and the template defining a template pattern and an alignment mark wherein the template pattern is aligned off center to the spindle hole by a distance equal to a function of a position of a center of the spindle hole and a position of a center of a spindle to be disposed in the spindle hole;
   outlining, using the template, a substrate pattern to be etched on a surface of the substrate; and
   etching the substrate pattern onto the surface according to the substrate pattern.

2. The method as described in claim 1 wherein the template pattern is aligned off center to the spindle hole along a direction from a center of the spindle hole towards a position of the alignment mark.

3. The method as described in claim 2 wherein the template pattern is offset from a center of the spindle hole, along the direction, by amount equal to a difference between the position of the center of the spindle hole and the position of the center of the spindle.

4. The method as described in claim 1 wherein the template pattern further comprises servo information.

5. The method as described in claim 1, wherein the template pattern further comprises a data bit pattern comprising one of a bit patterned media pattern and a discrete track recording pattern.

6. The method as described in claim 1, wherein the template comprises dams and recesses to be imprinted into a layer of resist coating the surface.

7. A storage device, the device comprising:
   a spindle;
   a surface substrate;
   a spindle hole in the surface substrate for receiving the spindle; and
   a concentric template pattern and an alignment mark both disposed on the surface substrate,
      wherein the concentric template pattern is coaxial with respect to the spindle but eccentric with respect to the spindle hole.

8. The storage device as described in claim 7 wherein the spindle is abutted to an inner portion of the spindle hole.

9. The storage device as described in claim 7 wherein the template pattern is aligned off center to the spindle hole along a direction from a center of the spindle hole towards a position of the alignment mark.

10. The storage device as described in claim 9 wherein the template pattern is offset from a center of the spindle hole, along the direction, by an amount equal to a difference between the position of the center of the spindle hole and the position of the center of the spindle.

11. The storage device as described in claim 7 wherein the surface substrate is weight balanced with respect to said spindle.

12. The storage device as described in claim 7, wherein the template pattern further comprises a data bit pattern comprising one of a bit patterned media pattern and a discrete track recording pattern.

13. A method of aligning a device for use in a storage device, the method comprising:
   accessing the device, wherein the device comprises: a spindle hole; and a surface having disposed thereon a template pattern and an alignment mark wherein the template pattern is aligned off center to the spindle hole by a distance equal to a function of a position of a center of the spindle hole and a position of a center of a spindle to be disposed in the spindle hole; and
   abutting said device to the spindle near said alignment mark wherein upon said abutting said template pattern is concentric about said spindle.

14. The method as described in claim 13 wherein the template pattern is aligned off center to the spindle hole along a direction from the center of the spindle hole towards a position of the alignment mark.

15. The method as described in claim 14 wherein the template pattern is offset from the center of the spindle hole, along the direction, by amount equal to a difference between the position the center of the spindle hole and the position of the center of the spindle.

16. The method as described in claim 13 wherein the template pattern further comprises servo information.

17. The storage device of claim 9, wherein the template pattern is misaligned by a distance determined by subtracting a radius of the spindle from a radius of the spindle hole.

18. The storage device of claim 7, wherein the spindle hole is eccentric with respect to the spindle.

19. The storage device of claim 7 is a hard disc drive and the device is a magnetic recording medium.

20. The device of claim 7, wherein the template pattern includes servo information.

* * * * *